United States Patent Office 2,816,569
Patented Dec. 17, 1957

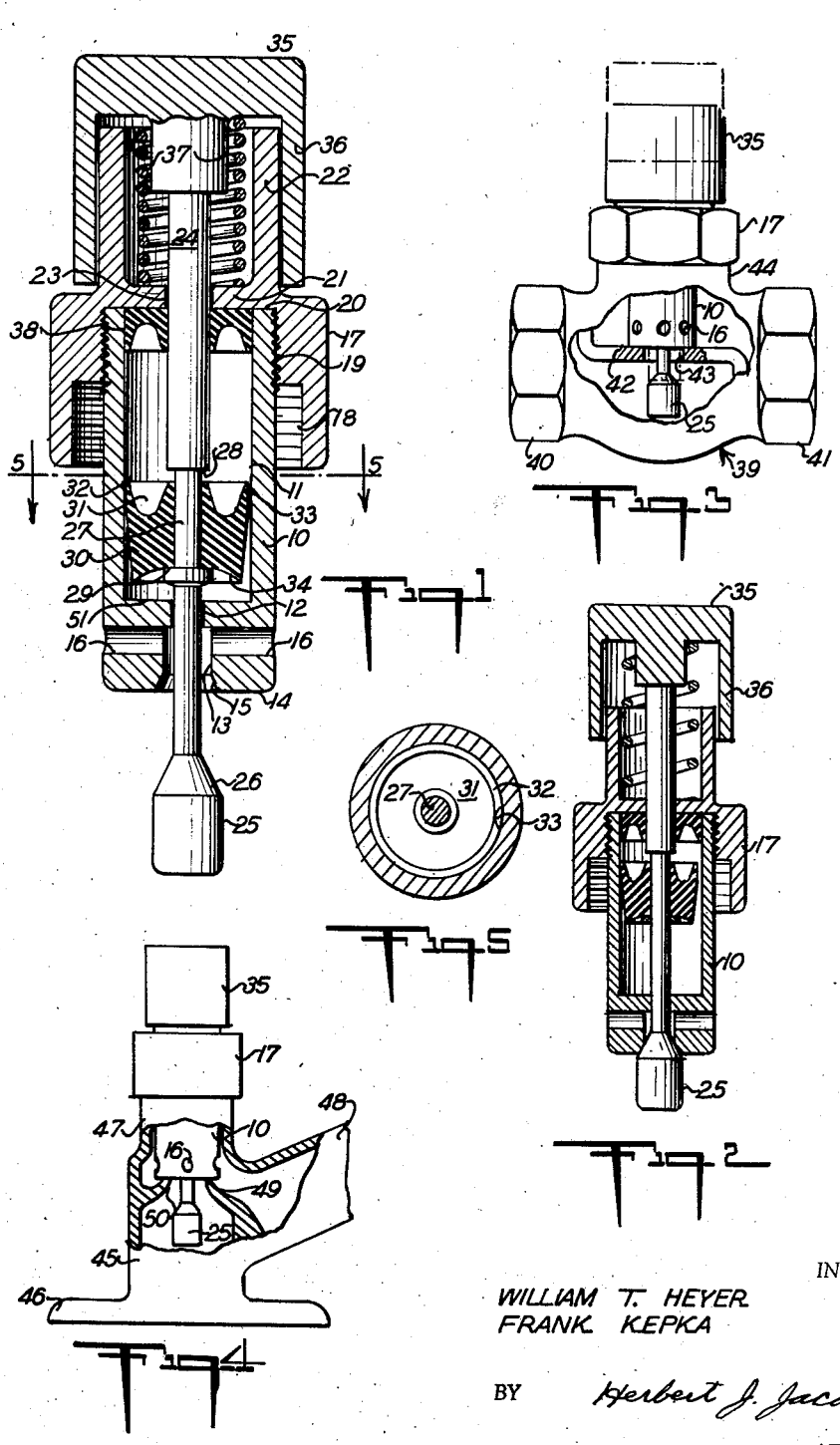

2,816,569

REPLACEMENT VALVE STEM ASSEMBLY FOR GLOBE AND FAUCET VALVES

William T. Heyer and Frank Kepka, Altadena, Calif.

Application September 28, 1954, Serial No. 458,824

5 Claims. (Cl. 137—454.6)

This invention relates to liquid distribution and more particularly to an automatically operable self-metering valve plug which may be utilized to replace the conventional valve plugs in a globe valve or faucet valve.

Heretofore many types of automatically operating self-metering valves have been developed and utilized, but the majority of these required an entire body assembly as well as the valve plug and were not applicable as replacements for the conventional valve plugs in globe valves and faucet valves. Furthermore, these prior art devices had numerous disadvantages such as requiring extremely strong springs which rendered operation difficult and furthermore, where relatively small vent openings were provided in order to time the closing of the valve and the quantity of liquid delivered, such openings tended to become clogged thus destroying the normal operation of the valve. Many of these prior art devices were also relatively complicated and consequently, frequently became inoperative for one reason or another and required relatively frequent maintenance work thereon.

It is accordingly an object of this invention to provide an automatically operating self-closing metering valve which may be utilized as a replacement for the valve plugs in conventional globe and faucet valves.

A further object of the invention is the provision of a self-closing metering valve for use in globe valves and faucet valves which requires a relatively light spring for closing the same, thus permitting convenient and easy manipulation thereof.

A still further object of the invention is the provision of a self-closing metering valve which includes a vent opening for timing the closing of the valve and in which such vent opening is self-cleaning; thus preventing clogging of the same with consequent failure of the valve.

Another object of the invention is the provision of a self-closing metering valve in which the reaction from a jet of liquid controlled by the valve operates to assist the closing action of a spring, thus permitting the use of a relatively light spring.

A further object of the invention is the provision of a self-closing metering valve comprising a valve plug which may be utilized to replace the valve plugs of conventional globe or faucet valves merely by removing the old plug and installing the new automatic metering valve plug in place thereof.

A still further object of the invention is the provision of a self-closing metering valve which constitutes an entirely self-contained valve plug including all of the parts necessary for the operation thereof, and utilizing none of the features of the valve plug in a conventional globe or faucet valve which it is intended to replace.

Another object of the invention is the provision of a self-closing metering valve plug which may be utilized to replace the valve plug in a conventional globe or faucet type valve and which requires no modification of such conventional valves.

Futher objects and advantages of the invention will be apparent from the following description taken in conjunction with the accompanying drawing wherein:

Fig. 1 is a longitudinal sectional view of a self-closing metering valve plug constructed in accordance with this invention;

Fig. 2, a view similar to Fig. 1 and showing the valve in closed position;

Fig. 3, a side elevational view with parts broken away for greater clarity and showing a conventional globe valve having the self-metering valve plug of this invention installed therein and with the valve shown in open position in full lines and in closed position in dotted lines;

Fig. 4, a side elevational view of a faucet type valve with parts broken away for greater clarity and showing the self-metering valve plug of this invention installed therein and with the valve in open position; and Fig. 5, a sectional view on the line 5—5 of Fig. 1 and showing the vent opening in the valve piston.

With continued reference to the drawing there is shown an automatically operable self-closing metering valve plug which may well comprise a body 10 of elongated cylindrical shape and provided with an internal bore 11, the purpose of which will presently appear. Body 10 is also provided with a reduced bore 12 in axial alignment with the bore 11 and a slightly enlarged bore 13 terminating adjacent the lower end 14 of the body 10 in a tapered or frusto-conical valve seat 15. Communicating with the bore 13 are a plurality of radially extending passages 16, any number of which may be provided, and the purpose of such passages will be later described.

A valve plug bonnet 17 may be provided having a relatively large threaded bore 18 at one end thereof, and a reduced threaded bore 19 terminating in a shoulder 20. The body 10 may be provided with screw threads mating with the threads in the bore 19 of the bonnet 17 and may serve to conveniently assemble the body 10 and bonnet 17 together. The shoulder 20 is part of an end wall 21 in the bonnet 17 and above this end wall there extends a cylindrical sleeve 22. The purpose of this sleeve 22 will be presently described.

The wall 21 is provided with a centrally located aperture 23 and slidably received in this aperture is a valve stem 24 which extends downwardly through the bore 11 in the body 10 and through the bore 12, bore 13 and has secured to the lower end thereof a valve member 25. Valve member 25 is provided on the upper end thereof with a conical or tapering valve surface 26 which is complimentary to the valve seat 15 in the lower end of body 10 and when engaging such valve seat, as shown in Fig. 2.

Valve member 25 may be removably secured to the valve stem 24 by screw-threads or grooves provided in the valve stem 24 although any other suitable securing means may, of course, be utilized. Valve member 25 is preferably formed of a yieldable material such as rubber or the like, in order that the same may be removed from or applied to the valve stem, 24, manually and without the use of the tools. However, if desired, the valve member 25 may be formed of metal.

The valve stem 24 is provided intermediate its length with a reduced portion 27 provided by shoulders 28 and 29 and received on this reduced portion 27 is a piston 30 which may be formed of rubber or other suitable, yieldable material. As shown in Fig. 1, the piston 30 is provided in its upper end with an annular recess 31 which terminates in a yieldable lip 32 engaging the inner surface of bore 11, which forms a cylinder for receiving the piston 30. The lip 32 is provided with an axially extending groove 33, which forms a vent passage and operates in a manner and for a purpose to be presently described. The lower end of the piston 30 is provided with a spherical recess which performs a very important function in the valve of this invention, and the function and operation of this recess will presently appear.

The upper end of the valve stem 24 is provided with a finger engaging knob 35 which may be removably secured on the valve stem 24 and knob 35 is provided with a downwardly extending flange or skirt 36 which surrounds the sleeve 22 extending upwardly from the wall 21 of the bonnet 17. Received within the recess formed by the sleeve 22 of the bonnet 17 is a compression spring 37, the upper end of which abuts the inner surface of the finger-engaging knob 35 and the lower end abuts the upper surface of wall 21 in bonnet 17.

Received within the bore 11 in a body 10 and tightly engaging the wall thereof is a sealing ring 38 which may be formed of rubber or other suitable material, and this sealing ring tightly engages the surface of valve stem 24 to prevent leakage from the cylinder provided by the bore 11 through the bore 23 and into the recess provided by the sleeve 22 on the bonnet 17.

In Fig. 3, the self-closing metering valve plug of this invention is shown as applied to a conventional globe valve 39 provided with hexagonal wrench engaging portions 40 and 41 to facilitate attachment of the same to pipes or other fittings and provided internally with a partition 42 having an aperture 43 therein.

The valve plug of this invention is applied to the globe valve 39 shown in Fig. 3, by removing the conventional valve plug therefrom and by inserting the valve body into the valve 39 until the end 14 of the valve body 10 engages the upper surface of partition 42. The threaded bore 18 of the bonnet 17 is threaded on to the upwardly extending neck 44 of the valve 39 and serves to securely clamp the lower end 14 of the body 10 in liquid-tight engagement with the upper surface of partition 42. It will be noted, that the valve member 25 extends downwardly through the aperture 43 in partition 42 and that with the valve member 25 in the open position, as shown in Fig. 3, liquid will flow through the end of the valve 39 having wrench engaging portions 40 upwardly through the aperture 43 and through the bore 13 and passages 16 outwardly above the partition 42 and through the end of the valve having the hexagonal portion 41. Movement of the valve member 25 upwardly into the closed position, as shown in Fig. 2, will stop flow of liquid through the valve 39.

The self-closing metering valve plug of this invention is shown as applied to a faucet type valve in Fig. 4, in which a valve body 45 is provided with a flange 46 for engaging the upper surface of a bathroom fixture, sink or the like, the valve body 45 also having an upwardly extending neck 47 and a laterally extending spout 48. The valve body 45 of the faucet type valve is normally provided with a seat 49 for engaging the usual packing and in the application of the valve plug of this invention to the faucet valve the lower surface 14 of the plug body 10 engages the seat 49 and is held in liquid-tight engagement therewith by screw-threaded engagement of the bonnet 17 with the neck 47 of the faucet valve body 45.

As will be seen from an inspection of Fig. 4, the valve member 25 projects downwardly through the opening 50 in the valve seat 49 and when in open position, as shown in Fig. 4, liquid will flow upwardly through the opening 50, the bore 13 in the plug body 10 and through the passages 16 to the interior of the spout 48 and thence outwardly into the basin or other fixture.

In operation and assuming the automatic metering valve plug of this invention to be in closed position, as shown in Fig. 2, with the valve surface 26 of the valve member 25 in engagement with the valve seat 15 in the plug body 10, flow of liquid through the opening provided by the valve seat 15, the bore 13 and the passages 16 will be prevented. When it is desired to operate the valve the finger engaging member 35 is moved downwardly against the action of the compression spring 37 to move the piston 30 downwardly in the cylinder provided by the bore 11 in the plug body 10 to the position shown in Fig. 1, and with the valve member 25 moved downwardly with the valve surface 26 thereof, away from the valve seat 15. In this position, as will be clearly seen, liquid may flow upwardly through the opening provided by the valve seat 15 through the bore 13 and the passages 16 outwardly of the plug body 10 and through the valve in which the plug body is installed.

The piston 30 in the cylinder provided by the bore 11 in the plug body 10 provides a dash pot and as soon as the valve has been opened to the position shown in Fig. 1, the same starts to close under the action of compression spring 37, and such closing action will be retarded by the piston 30 moving upwardly in the cylinder. However, pressure above the piston 30 will be relieved at a predetermined rate by leakage thereof through the vent passage 33 in the piston 30, and the speed of movement and time of closing of the valve will be determined by the size of the vent passage 33. The action of the spring 37 in moving the piston 30 and valve member 25 upwardly to closed position will be accentuated by the fact that liquid flowing upwardly through the bore 13 and into the passages 16 will also flow through the bore 12 which is somewhat larger than the outer diameter of valve stem 24 at that point, and such liquid will impinge against the surface of spherical recess 34 and be directed downwardly into engagement with the surface 51 of the lower end of the bore 11 in plug body 10, thus providing a jet action in which the reaction of the stream of liquid tends to force the piston 30 upwardly to accentuate the upward pressure of spring 37. This jet or reaction force permits the use of a considerably lighter spring 37 than would be the case if such spring were depended upon to provide the only force for moving the valve stem upwardly to closed position. It has been found that even though spring 37 is omitted or breaks that the reaction force resulting from the spherical recess 34 is sufficient to close the valve.

When the piston 30 reaches the uppermost position, the valve surface 26 on the valve member 25 will engage the seat 15 and shut off the flow of liquid, and since the time required for the piston 30 to move from its lowermost to its uppermost position is predetermined by the size of the vent 33, the quantity of liquid flowing through the valve will also be predetermined.

It is to be noted by reason of the fact, that the vent opening or passage 33 is in the outer surface of the piston 30, that the same will have a wiping action against the internal surface of the cylinder provided by the bore 11 in plug body 10, and consequently, any dirt or other foreign material which tends to lodge in the vent passage 33 will be removed therefrom by this wiping action, thus providing a self-cleaning operation which prevents clogging or stoppage of the vent passage with consequent failure of the valve mechanism. Any leakage from the chamber of cylinder provided by the bore 11 in the plug body 10 will be prevented by the sealing ring 38 and any of the parts may be conveniently replaced by merely removing the plug body 10 from the bonnet 17 and by removal of the valve member 25 from the lower end of valve stem 24, which will permit complete dis-assembly of the device. Due to the relative diameters of the various parts and the materials employed, this assembly or dis-assembly operation may be accomplished manually without the use of tools.

It will be seen that by the above described invention, there has been provided a relatively simple, yet highly effective, automatically operating self-closing metering valve plug which may be utilized to replace the valve plug in conventional valves, particularly of the globe or faucet type and in which no modification whatsoever, of such conventional valves is necessary to permit installation of the plug of this invention. Furthermore, the valve plug of this invention will continue to operate efficiently even though considerable sediment or other foreign material may be present in the water or other liquid passing therethrough, since by reason of the particular structure of the vent passage self-cleaning operation is assured and consequently, the valve will maintain a high degree of accuracy for long periods of time and regardless of normal wear therein.

Likewise, the valve plug of this invention is an entirely self-contained mechanism and provides a complete replacement for the conventional valve plug in a globe or faucet type valve.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A self-closing metering valve plug for replacing the valve plug in a conventional globe or faucet type valve, said metering valve plug comprising a plug body, a cylinder in said body closed by an end wall, a central bore in said end wall, an enlarged bore concentric with said bore and terminating in an outwardly tapered valve seat, radial passages in said body communicating with said enlarged bore, a bonnet removably secured to the opposite end of said body and having a wall closing the opposite end of said cylinder, a central aperture in said last mentioned wall, a sleeve extending upwardly from siad last mentioned wall to provide a recess, a valve stem slidably received in said aperture and said bore, the diameter of said stem being less than the diameter of said bore, a valve member secured to the lower end of said valve stem and having a tapered valve surface complementary to said valve seat, a finger engaging knob secured to the opposite end of said valve stem and having a depending skirt surrounding said sleeve, a compression spring disposed in said recess and engaging said last named wall and said knob to urge said valve stem upwardly and said valve member into engagement with said seat to close said valve, a reduced portion on said valve stem, a piston of yieldable material on said reduced portion and engaging the wall of said cylinder, a vent passage comprising an axial groove in the periphery of said piston and a spherical recess in the end of said piston confronting said end wall, the lower end of said plug serving to engage the valve seat of the globe or faucet type valve to prevent leakage whereby said piston and cylinder provides a dash pot, said vent passage being self-cleaning and liquid flowing through said bore is deflected by said spherical recess against said end wall to provide a reaction force augmenting the force exerted by said spring to close said valve.

2. A self-closing metering valve plug for replacing the valve plug in a conventional globe or faucet type valve, said metering valve plug comprising a plug body, a cylinder in said body closed by an end wall, a central bore in said end wall, an enlarged bore concentric with said bore and terminating in an outwardly tapered valve seat, radial passages in said body communicating with said enlarged bore, a bonnet removably secured to the opposite end of said body and having a wall closing the opposite end of said cylinder, a central aperture in said last mentioned wall, a sleeve extending upwardly from said last mentioned wall to provide a recess, a valve stem slidably received in said aperture and said bore, the diameter of said stem being less than the diameter of said bore, a valve member secured to the lower end of said valve stem and having a tapered valve surface complementary to said valve seat, a finger engaging knob secured to the opposite end of said valve stem and having a depending skirt surrounding said sleeve, a compression spring disposed in said recess and engaging said last named wall and said knob to urge valve stem upwardly and said valve member into engagement with said seat to close said valve, a piston on said valve stem and engaging the wall of said cylinder, a vent passage comprising an axial groove in the periphery of said piston and a spherical recess in the end of said piston confronting said end wall, the lower end of said plug serving to engage the valve seat of the globe or faucet type valve to prevent leakage whereby said piston and cylinder provides a dash pot, said vent passage being self-cleaning and liquid flowing through said bore is deflected by said spherical recess against said end wall to provide a reaction force augmenting the force exerted by said spring to close said valve.

3. A self-closing metering valve plug for replacing the valve plug in a conventional globe or faucet type valve, said metering valve plug comprising a plug body, a cylinder in said body closed by an end wall, a central bore in said end wall, an enlarged bore concentric with said bore and terminating in a valve seat, outlet passages in said body communicating with said enlarged bore, a bonnet removably secured to the opposite end of said body and having a wall closing the opposite end of said cylinder, a central aperture in said last mentioned wall, a valve stem slidably received in said aperture and said bore, the diameter of said stem being less than the diameter of said bore, a valve member secured to the lower end of said valve stem and having a valve surface complementary to said valve seat, a finger engaging knob secured to the opposite end of said valve stem, a compression spring engaging said last named wall and said knob to urge said valve stem upwardly and said valve member into engagement with said seat to close said valve, a piston on said valve stem and engaging the wall of said cylinder, a vent passage comprising an axial groove in the periphery of said piston and a spherical recess in the end of said piston confronting said end wall, the lower end of said plug serving to engage the valve seat of the globe or faucet type valve to prevent leakage whereby said piston and cylinder provides a dash pot, said vent passage being self-cleaning and liquid flowing through said bore is deflected by said spherical recess against said end wall to provide a reaction force augmenting the force exerted by said spring to close said valve.

4. A self-closing metering valve plug for replacing the valve plug in a conventional globe or faucet type valve, said metering valve plug comprising a plug body, a cylinder in said body closed by an end wall, a central bore in said end wall, an enlarged bore concentric with said bore and terminating in a valve seat, outlet passages in said body communicating with said enlarged bore, a bonnet removably secured to the opposite end of said body and having a wall closing the opposite end of said cylinder, a central aperture in said last mentioned wall, a valve stem slidably received in said aperture and said bore, the diameter of said stem being less than the diameter of said bore, a valve member secured to the lower end of said valve stem and having a valve surface complementary to said valve seat, a compression spring housed within the upper end portion of said bonnet above said wall to urge said valve stem upwardly and said valve member into engagement with said seat to close said valve, a circular actuating element integral with the upper end of said stem, an annular flange depending from said actuating element and engaged over the said upper end portion of the bonnet, a piston on said valve stem and engaging the wall of said cylinder, a vent passage comprising an axial groove in the periphery of said piston and a deflection surface on the end of said piston confronting said end wall, the lower end of said plug serving to engage the valve seat of the globe or faucet type valve to prevent leakage whereby said piston and cylinder provides a dash pot, said vent passage being self-cleaning and liquid flowing through said bore is deflected by said deflection surface against said end wall to provide a reaction force augmenting the force exerted by said spring to close said valve.

5. A self-closing metering valve plug for replacing the valve plug in a conventional globe or faucet type valve, said metering valve plug comprising a plug body, a cylinder in said body closed by an end wall, a central bore in said end wall, an enlarged bore concentric with said bore and terminating in a valve seat, outlet passages in said body communicating wtih said enlarged bore, a bonnet removably secured to the opposite end of said body and having a wall closing the opposite end of said cylinder, a central aperture in said last mentioned wall, a valve stem slidably received in said aperture and said bore, a valve member of yieldable material removably secured to the lower end of said valve stem and having a valve surface complementary to said valve seat, means to urge said valve stem upwardly and said valve member into engagement with said seat to close said valve, an annular groove in said valve stem, a piston of yieldable material removably received in said groove for movement with said valve stem, said piston engaging the wall of said cylinder and having a vent passage therein to provide a dash pot the diameter of the portion of said valve stem disposed in said central bore being less than the diameter of the portion of said valve stem disposed in said central aperture, the relative diameters of the different portions of said valve stem and the yieldability of said valve member and piston permitting assembly or disassembly manually without tools, the lower end of said plug serving to engage the valve seat of the globe or faucet type valve to prevent leakage.

References Cited in the file of this patent
UNITED STATES PATENTS

| | | |
|---|---|---|
| 1,856,664 | Steen | May 3, 1932 |
| 1,950,749 | Ross | Mar. 13, 1934 |
| 1,995,792 | Brown | Mar. 26, 1935 |
| 2,324,946 | Molloy | July 20, 1943 |
| 2,592,256 | DuCharme | Apr. 8, 1952 |